May 9, 1961
S. F. LYBARGER
2,983,797
HEARING AID
Filed April 14, 1959
3 Sheets-Sheet 1
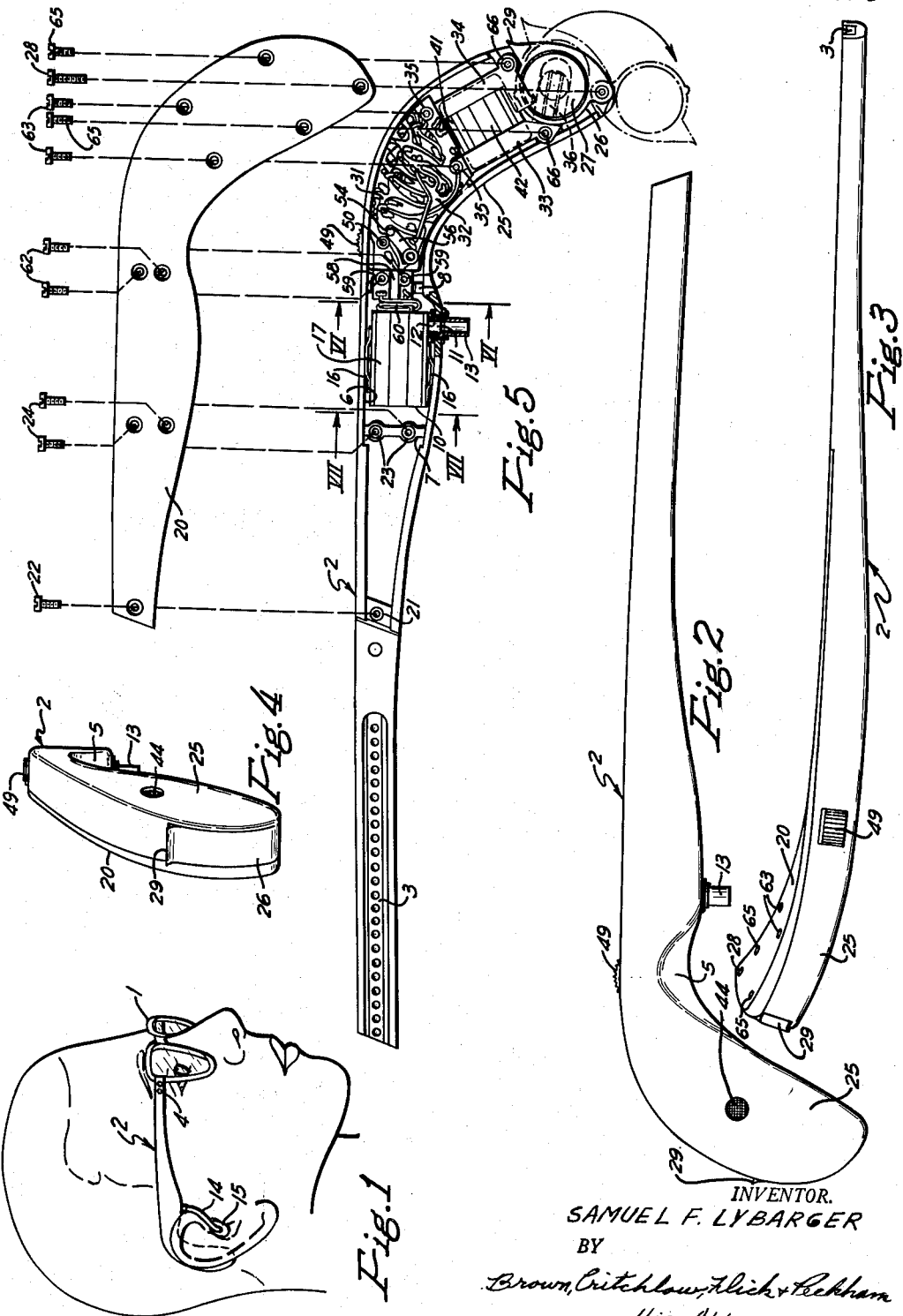
INVENTOR.
SAMUEL F. LYBARGER
BY
Brown, Critchlow, Flick & Peckham
His Attorneys May 9, 1961  S. F. LYBARGER  2,983,797
HEARING AID
Filed April 14, 1959  3 Sheets-Sheet 2
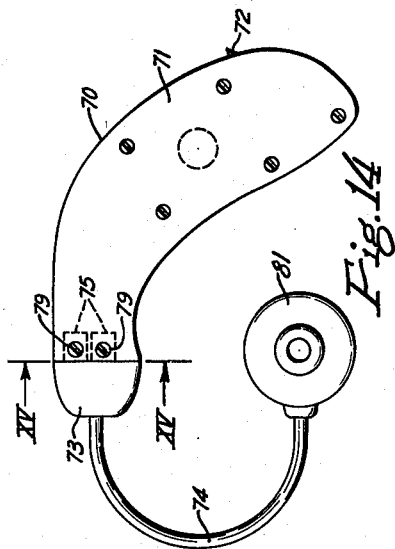
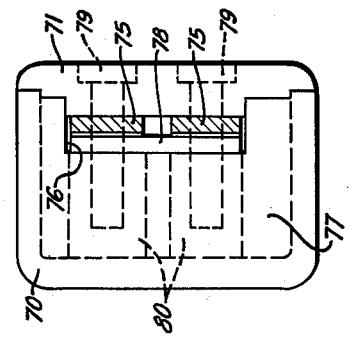
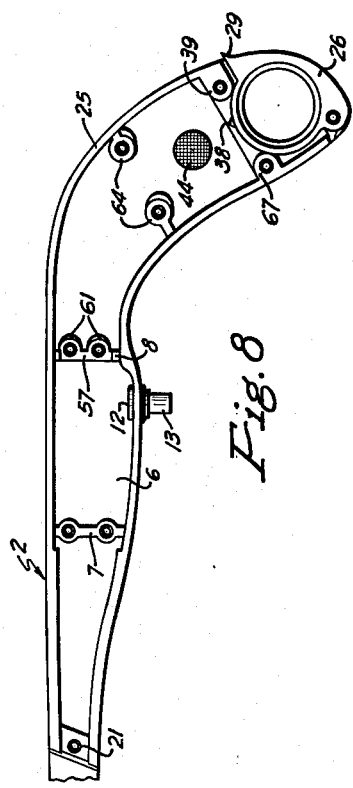
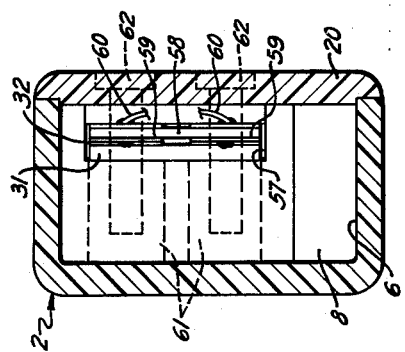
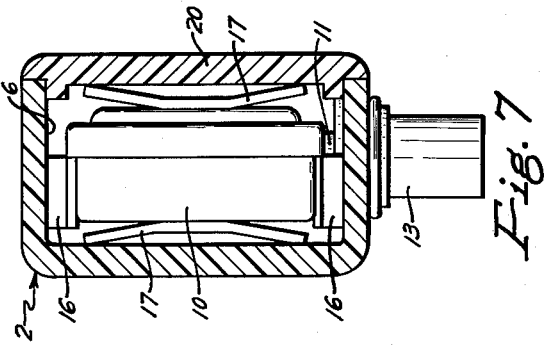
INVENTOR.
SAMUEL F. LYBARGER
BY
Brown, Critchlow, Flick & Peckham
His Attorneys May 9, 1961 S. F. LYBARGER 2,983,797
HEARING AID
Filed April 14, 1959 3 Sheets-Sheet 3
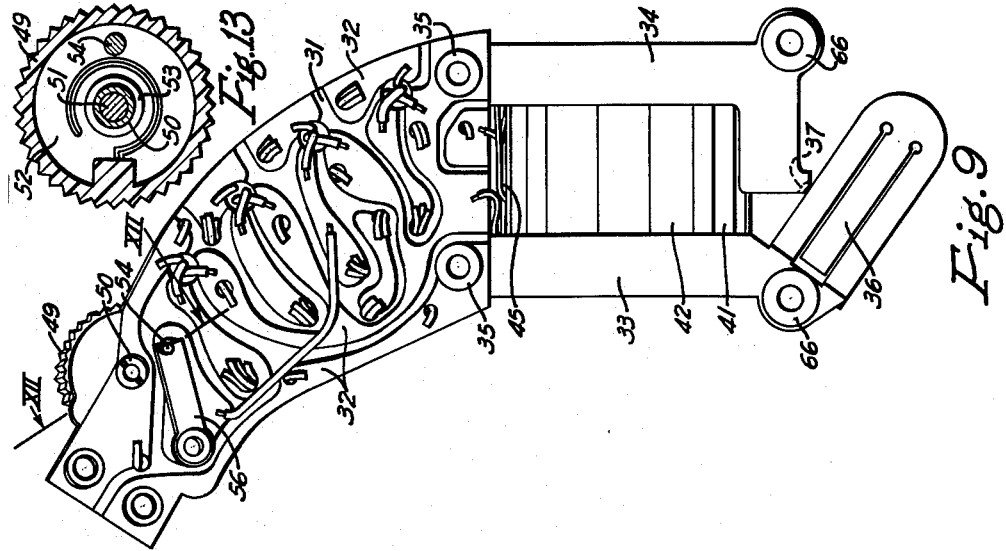
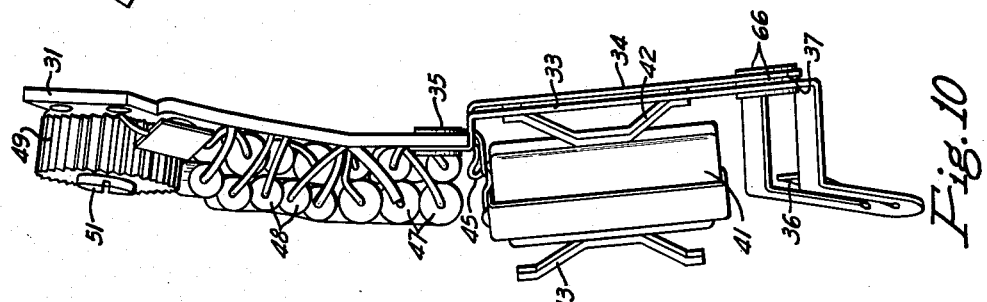
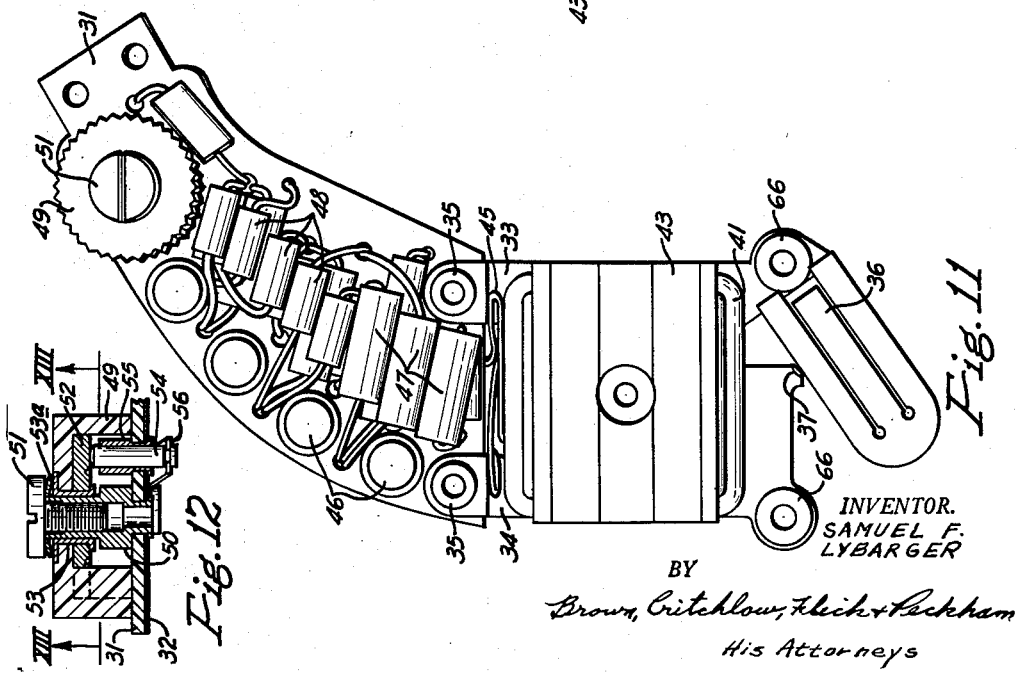
INVENTOR.
SAMUEL F. LYBARGER
BY Brown, Critchlow, Flick & Peckham
His Attorneys United States Patent Office 2,983,797
Patented May 9, 1961

2,983,797
HEARING AID

Samuel F. Lybarger, Canonsburg, Pa., assignor to E. A. Myers & Son, Inc., Canonsburg, Pa., a corporation of Pennsylvania Filed Apr. 14, 1959, Ser. No. 806,247
6 Claims. (Cl. 179—107)

This invention relates to hearing aids, and more particularly to those of the eyeglass and over the ear types.

Both of these types of hearing aids are now well known and in wide use, but there is room for improvement. Most of them are difficult for the dealer to service, thereby requiring that they be returned to the manufacturer. That deprives the hard of hearing person of his hearing aid for a few days, and in the case of eyeglass hearing aids, of his glasses too. Another objection that the public has had to eyeglass hearing aids has been the bulky temples, both behind and in front of the ears. Furthermore, the hearing aid is often separated into components, part of which are located in one temple and the rest in the other temple. That creates wiring difficulties at the hinges of the eyeglass and prevents the use of binaural hearing aids. Heretofore, it has been the practice to use different amplifier or chassis units for eyeglass temples and over the ear cases because one would not fit the other, thereby requiring the manufacture and stocking of units of two different sizes. Difficulty has also been experienced in eyeglass hearing aids with magnetic, acoustic or mechanical feedback.

It is among the objects of this invention to provide a hearing aid, in which the same chassis unit can be used either in eyeglass temples or in over the ear cases, in which the chassis unit and receiver are easily replaceable, in which the chassis also supports the microphone and battery, in which the hearing aid is easily serviced by the dealer, in which a complete hearing aid can be used with either ear or both, in which an eyeglass hearing aid has slim temples in front of the ears and non-bulky ones behind the ears, in which there is high acoustic gain with a minimum of feedback, and in which the volume control can readily be replaced by one of a different value.

The invention is illustrated in the accompanying drawings, in which

Fig. 1 is a perspective view of my hearing aid eyeglass in use;

Fig. 2 is an enlarged view of the outer side of the right-hand temple before it has fitted;

Fig. 3 is a top view of the temple;

Fig. 4 is a rear end view of the temple;

Fig. 5 is an exploded view of the inner side of the temple with the cover removed;

Figs. 6 and 7 are vertical sections taken on the lines VI—VI and VII—VII, respectively, of Fig. 5 with the cover attached;

Fig. 8 is a fragmentary view of the inside of the temple with the hearing aid elements removed;

Fig. 9 is an enlarged side view of the chassis unit;

Fig. 10 is a front edge view of the chassis;

Fig. 11 is a view of the opposite side of the chassis;

Fig. 12 is a cross section of the volume control taken on the line XII—XII of Fig. 9;

Fig. 13 is a section through the volume control taken on the line XIII—XIII of Fig. 12;

Fig. 14 is a view of the inner side of an over the ear type hearing aid; and

Fig. 15 is a cross section taken on the line XIV—XIV of the preceding figure.

Referring to Fig. 1 of the drawings, my eyeglass hearing aid includes an eyeglass lens frame 1, to the opposite ends of which are hinged the front ends of a pair of temples 2 that extend back beside the head and over the ears. Behind the ears the temples extend downwardly at an inclination and inwardly in engagement with the head. Since there are no hearing aid wires extending from one temple to the other, the lens frame 1 need not be considered further here. The two temples are identical, except that one is shaped to fit against the right-hand side of the head and the other is shaped for the left-hand side. The components of a complete hearing aid can be mounted in either temple, depending upon which ear needs help; or, if a person is hard of hearing in both ears, both temples can be used as hearing aids for binaural hearing. Since the same kind of components are needed for each temple, only the right-hand temple will be discussed here.

The temple is molded from suitable plastic material and substantially its front half is straight and solid, except for a perforated metal strip 3 embedded in a depression in its inner surface, as shown in Fig. 5. When the temple is being applied to an eyeglass lens frame during fitting, the front end of the temple is cut off at the correct length and the frame hinge is then attached to the temple by rivets 4 (Fig. 1) through holes drilled through the plastic at a couple of the perforations at the front end of the metal strip. The rear half of the temple is hollow, and at the junction of its outer wall with its lower wall where the temple curves over the upper part of the ear, the temple is chamfered or scooped out to form a concavity 5, shown in Figs. 2 and 4, that fits comfortably against the ear. Directly in front of this concavity, the width and vertical depth of the temple are increased somewhat to form a chamber 6 between longitudinally spaced thin vertical walls 7 and 8, as shown in Figs. 5 and 8.

Disposed in this chamber is a rectangular transducer or receiver 10 that has a depending nipple 11 at one end that projects down into a highly resilient sleeve 12 mounted in the upper end of a short tube 13. The tube is rigidly mounted in the lower wall of the chamber and projects a short distance below it. It is to the lower end of this tube that a flexible tube 14 (Fig. 1) is connected for conveying sound from the receiver to a hollow ear mold 15 inserted in the ear. The nipple and tube 13 connection hold the receiver in place longitudinally, and it is spaced from the side walls of the temple by cushions, such as by convex rubber strips 16 cemented to its top and bottom and, as shown in Fig. 7, by concave rubber sheets 17 cemented to its outer and inner sides.

In front of the receiver chamber the temple tapers forward to the rear end of the solid portion of the temple, this tapered portion being hollow to reduce the weight of the temple and to also facilitate molding. The inner wall of the hollow part of the temple is formed by a thin cover plate 20, the front end portion of which is flush with the inner surface of the solid front end of the temple, as shown in Fig. 3. At the front end of the hollow portion of the temple (Figs. 5 and 8) a threaded bushing 21 is molded into it and receives a screw 22 by which the front end of the cover plate is attached to the body of the temple. The front wall 7 of the receiver chamber is provided with a pair of similar bushings 23 for receiving two more attaching screws 24 extending through the cover.

It is a feature of this invention that the portion of the hollow temple extending backward and downward from the back of the receiver chamber forms a case 25 for most of the elements of the hearing aid. It will be seen in Fig. 8 that the case has a forwardly curved upper end portion that extends over the ear and has as its front end wall the same thin wall 8 that forms the rear wall of the receiver chamber. Due to the relatively long length of the case, it has the desired capacity without being unduly wide or thick. Consequently, this temple is not much bulkier than ordinary eyeglass temples that do not utilize hearing aids.

The side wall of case 25 at its lower end is cut away, but the opening thus formed is closed normally by a ring-like battery holder 26. This holder is provided with a circular opening for snugly receiving a cylindrical mercury battery 27, the opposite sides of which form its terminals. One side of the holder is pivoted in the lower end of the case by a headed pin 28 extending through the cover and having a threaded end screwed into the body of the temple. The opposite side of the holder has a lip 29 that projects from the back of the case just far enough to permit the finger nail to engage it and pull it downward in order to swing the battery holder down out of the case to the lower dotted line position shown in Fig. 5 for changing the battery.

Another feature of this invention is that the remaining components of the hearing aid are all electrically and mechanically connected together into a single chassis unit that can be quickly and easily removed from the case by merely removing the screws that extend through the cover. No wiring has to be handled. As best shown in Figs. 9, 10 and 11, the chassis unit includes a thin insulating plate 31, to one side of which an electric circuit 32 is secured. Preferably, the circuit includes a printed circuit or one formed by coating the plate with a thin layer of copper and then etching away what is not wanted. The plate is curved to fit snugly inside the upper half of the case and therefore has a convex upper edge, a wide lower end and a narrow upper end. The plate also is twisted slightly to conform to the twist of the case.

To the lower corners of the circuit plate on the side opposite the circuit, thin metal spring strips 33 and 34 are secured by eyelets 35 that electrically connect the strips with the circuit. These strips are bent to provide short portions extending across the end of the plate and away from its opposite side to keep the strips from turning, and then the strips are bent again to provide relatively long parallel portions that extend downwardly away from the plate. The outer or lower end of strip 33 is bent at a right angle to extend outward across the case, where it again is bent to form a portion extending along the outer wall of the case diametrically across the outer side of the battery. This portion of the strip is provided with a struck-out tongue 36 that presses against the adjoining side of the battery to make electrical contact with it. The corresponding end of the other strip extends toward strip 33 and has a lower corner that is bent toward the battery holder to provide a sharp point 37 that digs into the inner terminal of the battery close to its upper edge. Consequently, when the battery is swung by its holder up into the case, it is moved between the outer ends of the two metal strips and is tightly engaged by them. To switch off the hearing aid, the battery holder is merely swung downward far enough to pull the battery out of engagement with spring point 37. That is a very short distance. The holder can be held in that position by means of an integral detent 38 projecting from the top of it normally a short distance in front of a small boss 39 molded into the back of the case. When the battery holder is pulled down to the upper dotted line position shown in Fig. 5 this detent will engage the boss and prevent the holder from swinging farther out of the case unless additional force is applied to the holder to cause the detent to spring past the boss. This arrangement is desirable because it permits the hearing aid to be shut off without the battery holder hanging down from the temple in an unsightly position.

An electrical transducer, which is a microphone 41 when transducer 10 is a receiver, is carried by the two spring strips 33 and 34 between them and the outer wall of the case. The strips therefore serve both as microphone supports and conductors for the battery. The microphone is resiliently connected to the strips in any suitable manner, but preferably by a concave rubber sheet 42, the center of which is cemented to the microphone and the edges of which are cemented to the strips. The opposite side of the microphone may be provided with a similar cushion 43 spacing it from the outer wall of the case, but not cemented to that wall. The outer wall of the case is provided with a small screened opening 44 beside the microphone for admission of sound waves to the microphone. The microphone is electrically connected by flexible wires 45 with the electric circuit 32, which is likewise connected through holes in the circuit plate with amplifying elements on the opposite side of the plate. These elements include several transistors 46 secured to the insulating plate, preferably close to its convex edge, and a larger number of condensers 47 and resistors 48 mounted on the same side of the plate between the transistors and its lower edge.

Also mounted on the same side of the plate near its upper end is a volume control. As shown in Figs. 12 and 13, this control includes a knurled cup-shape or hollow insulating knob 49 that is rotatably mounted on a metal stud 50 projecting from the circuit plate, in which it is rigidly mounted in contact with circuit 32. The knob is held on the stud by a screw 51 extending through the center of the knob and threaded into the adjoining end of the stud. Mounted on the inner surface of the knob around the stud is a flat electrical resistance element 52 that is parallel to the plate. This element is engaged by the inner end of a metal eyelet 53 extending through the knob around stud 50. A spring washer 53a is compressed between the outer end of the eyelet and the head of screw 51. The eyelet also electrically connects the resistance element into the electric circuit. As shown in Fig. 13, a line in the general shape of a question mark is etched or cut in the resistance material so that it will have a free end and an end connected to the eyelet. The resistance element is engaged by the inner end of a metal pin 54 that is slidable in a tiny sleeve 55 mounted in the plate. The opposite end of the pin projects from the plate and is attached to one end of a leaf spring 56, the opposite end of which is secured to the circuit. The spring presses the pin against the resistance element in the volume control knob. A different resistance value can be used by simply removing screw 51 and replacing the knob with another one carrying a resistor of the desired value. The upper part of the volume control knob projects a slight distance from the top of the temple through a rectangular opening. The sound can therefore be adjusted easily by the finger turning the knob forward or backward.

The narrow upper end of circuit plate 31 is fastened in the case by providing the upper end wall 8 of the case with an opening or notch 57, which is deep enough to receive the end of the plate and also a thin overlapping rectangular connector, as shown in Figs. 5 and 6. The connector is formed from an insulating piece 58 carrying a pair of spaced metal terminals 59 on both sides connected by flexible wires 60 to the receiver. These terminals engage the upper ends of plate circuit 32 and all are provided with holes aligned with threaded metal bushings molded into bosses 61 integral with the front transverse wall 8 of the case. Screws 62 extending through the cover plate and the aligned openings hold the connector and circuit plate tightly together in electrical contact with each other. Another pair of screws 63 extend through the cover and circuit plate eyelets 35 and into threaded bushings in bosses 64 molded into the case about half way between its upper and lower ends. Two more screws 65 extending through the cover and insulating eyelets 66 in spring strips 33 and 34 near their lower ends extend into threaded bushings in boss 39 and another boss 67 opposite to it. Consequently, the same screws that help hold the cover in place also connect the receiver terminals with the circuit plate and firmly mount that plate and the spring strips in the case. The heads of the screws can be countersunk in the cover plate and covered with wax to avoid possible short circuiting by moist skin.

One of the advantages of this invention is that by making all of the hearing aid parts easily removable from a temple, the same temple can be used for either an active or a dummy temple as far as the hearing aid is concerned. Thus, if either of the temples is to be a dummy temple the chassis unit and receiver are not inserted in it, and tube 13 either is not fastened to the bottom of chamber 6 or, if it is already there, it is removed. The hole that is left in the bottom of the temple and the hole in the top through which the volume control knob would project can then be closed from the inside by plastic plugs, not shown, held in place by friction or by springs behind them. A spare battery may be inserted in battery holder 26 if desired.

My eyeglass hearing aid permits a dealer to easily remove the operating elements from a temple for servicing or for changing the type of amplification characteristics, as contrasted with many eyeglass hearing aids in which the operating elements are integrally built into the temples or involve considerable wiring that has to be disconnected before they can be removed. The design of my chassis unit is such that it eliminates the necessity for running long wires from one end of the temple to the other to make connections to the various components. In fact, except for the flexible leads to the receiver, which are necessary to prevent mechanical vibration transmission, loose wiring has been eliminated. Instead of separately attached battery contact springs with wires leading to the chassis, the springs are firmly attached to the chassis and also serve a secondary purpose of supporting an electrical transducer in a suitable location. The temple is of such a shape that it fits well over the ear and can be made to conform to the contour of the head very successfully. It is not bulky and unsightly or even conspicious. Monaural and binaural hearing aids can be assembled with equal facility. Furthermore, if a monaural hearing aid is employed initially, the components necessary to make it a binaural hearing aid can be added at any time.

It is also possible to reverse the direction of amplification in the chassis unit, so that the signal is received at the front end and amplified as it reaches the bottom rear end of the chassis. In such a case, the positions of the microphone and receiver would be reversed.

The hearing aid chassis that has just been described can be used interchangeably either with case 25 formed integrally with an eyeglass temple, or with the case of an over the ear type hearing aid. Such a hearing aid is illustrated in Figs. 14 and 15. It will be seen that the size and shape of the case 70 is identical to that of case 25 shown in Fig. 12. It is the same as if case 25 had been cut off directly in front of its thin transverse wall 8. Of course, the cover 71 for case 70 terminates at the same point. A hearing aid chassis the same as has been described herein is mounted in the case in exactly the same way as in a temple case and is held in place by the screws that attach the cover. Of course, the case is also provided with a pivoted battery holder 72.

On the other hand, a receiver is not supported at the upper end of the case as it is with the eyeglass temple. Instead, a molded plastic electric plug 73 is secured to the upper end of the case. This plug, from the front of which an electric cord 74 extends, has two flat metal prongs 75 projecting from its rear end. The inner ends of the prongs, of course, are connected to the two wires of the cord. As shown in Fig. 14, the prongs are of a size that can be inserted in the front end of the case through the notch 76 with which the front end wall 77 of the case is provided. The prongs overlap the perforated front end of a chassis circuit plate 78 also disposed in the notch, and are provided with holes through which extend screws 79 that are threaded in bosses 80 molded in the case. The screws cause the cover to press the prongs into electrical contact with the circuit plate and rigidly connect the plug to the case.

The lower end of cord 74 is electrically connected to a receiver 81 that can be snapped into an ear mold in an ear in the usual way. The electric cord is semirigid; that is, it will hold any shape into which it is bent. Consequently, it is used like a hook to hold the case in place over the ear and against the side of the head.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A hearing aid comprising a hollow case shaped to fit against the head beside the back of the ear and having a forwardly curved upper end portion, the side wall of the case at its lower end being provided with an opening, a battery-receiving holder normally closing said opening and extending up into the case, means pivotally connecting one side of the holder to the case to permit the holder to be swung down out of the case to a battery-receiving position, the holder being provided with a detent adapted to engage the inside of the case to frictionally hold the holder in a position where it is only partly swung out of the case unless sufficient pressure is applied to the holder to force said detent down past its engagement with the case, and a chassis unit including microphone and amplifier and volume control removably mounted in the case and having a forwardly curved upper end portion fitting in said upper end of the case, said chassis including means for electrically connecting it with a battery in said holder, said last-mentioned means including a sharp metal point pressed against one side of the battery near its upper edge, the battery being removed from said point when said holder is swung down until said detent engages the case, and the upper end of the chassis including means for electrically connecting it with a receiver.

2. In a hearing aid the combination with a hollow case shaped to fit against the head beside the back of the ear and having a forwardly curved upper end portion, a chassis unit comprising an electric circuit plate removably mounted in the case and having a forwardly curved upper end portion fitting in said upper end of the case, the lower end of the plate being located about midway between the upper and lower ends of the case, a plurality of amplifier components and a volume control mounted on one side of the plate, a transducer disposed in the case below said lower end of the plate, and means extending downwardly away from said end of the plate and supporting the transducer.

3. A hearing aid chassis unit comprising an electric circuit plate, a plurality of amplifier components mounted on one side of the plate, a volume control mounted on the same side of the plate at one end thereof, a pair of metal strips supported by and extending away from the opposite end of the plate and electrically connected thereto, the outer ends of the strips being formed for electrical connection to a battery, and a transducer disposed between said plate and the outer ends of said strips and supported by the strips.

4. A hearing aid chassis unit comprising an electric circuit plate, a plurality of amplifier components mounted on one side of the plate, a volume control mounted on the same side of the plate at one end thereof, a pair of metal strips supported by and extending away from the opposite end of the plate and electrically connected thereto, the outer end of one strip being formed with a spring portion to engage one side of a battery, the outer end of the other spring having a point for engaging the opposite side of the battery close to its edge nearest said plate, a transducer disposed between the plate and said outer ends of the strips at one side of the strips, and means resiliently connecting the transducer to the strips.

5. A hearing aid chassis unit comprising an insulating plate, an electric circuit on one side of the plate, a plurality of amplifier components mounted on the opposite side of the plate and electrically connected with said circuit, a stud rigidly mounted in one end of said plate and projecting from said opposite side, the stud being electrically connected with said circuit, a hollow volume control knob rotatably mounted on said stud, a screw extending through the center of the knob and threaded in said stud to hold the knob thereon, an arcuate electric resistance element carried by the inner surface of the knob parallel to said plate, a metal pin slidably mounted in said plate and projecting into the hollow interior of the knob, a spring electrically connecting said circuit with the pin and pressing the pin against said resistance element, a transducer disposed beyond the end of the plate farthest from the volume control knob, and means extending away from the plate supporting the transducer.

6. A hearing aid chassis unit according to claim 5, in which a metal eyelet extends through said knob around said stud and engages said resistance element, and said resistance element is provided with a groove extending inward from its outer edge and then most of the way around said eyelet.

References Cited in the file of this patent
UNITED STATES PATENTS

| | | |
|---|---|---|
| 2,856,466 | Gustafson et al. | Oct. 14, 1958 |
| 2,882,348 | Evickson | Apr. 14, 1959 |

FOREIGN PATENTS

| | | |
|---|---|---|
| 210,888 | Australia | Oct. 10, 1957 |
| 792,742 | Great Britain | Apr. 2, 1958 |